US009043880B1

(12) United States Patent
Siddiqui

(10) Patent No.: US 9,043,880 B1
(45) Date of Patent: May 26, 2015

(54) DIRECTORY SERVICE USER EXPORTATION SYSTEM

(71) Applicant: Amazon Technologies, Inc., Reno, NV (US)

(72) Inventor: Ahmed Fuad Siddiqui, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/685,897

(22) Filed: Nov. 27, 2012

(51) Int. Cl.
*H04L 29/06* (2006.01)
*G06F 21/10* (2013.01)

(52) U.S. Cl.
CPC ..................................... *H04L 63/08* (2013.01)

(58) Field of Classification Search
CPC ....... H04L 63/08; H04L 63/102; H04L 63/10; G06F 21/6218; H04W 12/06
USPC .......... 713/168–174, 182–186, 202; 709/225, 709/229; 726/2–8
See application file for complete search history.

(56) References Cited

U.S. PATENT DOCUMENTS 6,335,927 B1 * 1/2002 Elliott et al. .................. 370/352
2007/0157292 A1 * 7/2007 Danner et al. .................... 726/4

* cited by examiner

*Primary Examiner* — Evans Desrosiers
(74) *Attorney, Agent, or Firm* — Thomas Horstemeyer, LLP

(57) ABSTRACT

Disclosed are various embodiments for exporting user accounts and associated information from a directory service for a local computing environment to the authentication service of a remote computing environment. A list of user accounts including usernames and other associated data is selected after querying the directory service. The selection of user accounts is then analyzed to make sure that a minimum set of data has been selected. Subsequently, the user account data is written to file, which can then be either programmatically uploaded or manually uploaded. In certain embodiments of the present disclosure, user account information may be directly exported to an authentication service through a network connection without the intermediate step of first writing the data to file.

20 Claims, 7 Drawing Sheets

200c

| Exporter Application 129 | _ □ X |
|---|---|
| File  Edit  Options | Help |

Select Groups or Users

| | |
|---|---|
| Administration | ☐ |
| Administrators | ■ |
| Atlanta Office | ☐ |
| Doe, Jane        133 | ■ |
| Doe, John | ■ |
| Employees | ☐ |
| Engineering | ■ |
| Grant, Alice | ☐ |
| Grant, Bob | ☐ |
| Grant, Sarah | ☐ |
| Greenville Office | ☐ |

Select Permissions to Assign

| | | | |
|---|---|---|---|
| Create CloudDB | ☐ | Create Cloud Server | ☐ |
| Delete CloudDB | ☐ | Delete Cloud Server | ☐ |
| Edit CloudDB | ☐ | Edit Cloud Server | ☐ |
| Create Cloud App | ☐ | Login Cloud Server | ☐ |
| Delete Cloud App | ☐ | Create Cloud Storage | ☐ |
| Edit Cloud App | ☐ | Delete Cloud Storage | ☐ |
| Upload Cloud App | ☐ | Edit Cloud Storage | ☐ |
| Create Virt. Cloud | ☐ | Use Cloud Storage | ☐ |

[ Export ]   [ Cancel ]

FIG. 2C

DIRECTORY SERVICE USER EXPORTATION SYSTEM

BACKGROUND

Numerous businesses and enterprises use remote computing services offered by various companies. As part of the remote computing services, business and enterprises may manually create users or groups and associated permissions. However, manual creation of large numbers of users and groups may take an inordinate amount of time, especially for large enterprises. Similarly problematic is the creation, deletion, and modification of remote computing service user accounts for organizations that experience significant employee turnover.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A, 2B, and 2C are drawings of examples of user interfaces rendered by a client in the networked environment of FIG. 1 according to various embodiments of the present disclosure.

DETAILED DESCRIPTION

The present disclosure relates to synchronizing user accounts and user account data between separate computing environments. A directory service that manages user accounts for the local computing environment is queried for a list of users and a list of data associated with user accounts. A selection of user accounts and a selection of data associated with the user accounts are obtained. Depending on security, privacy, and functional concerns, all user accounts and all associated data may be selected or a subset thereof may be chosen. The user accounts are then exported to a remote computing environment, where new user accounts are created and the selected data is associated with each corresponding new user account. Permissions are then assigned to the new user accounts, and authorization credentials are created on a per user account basis. In the following discussion, a general description of the system and its components is provided, followed by a discussion of the operation of the same.

Figure 1:
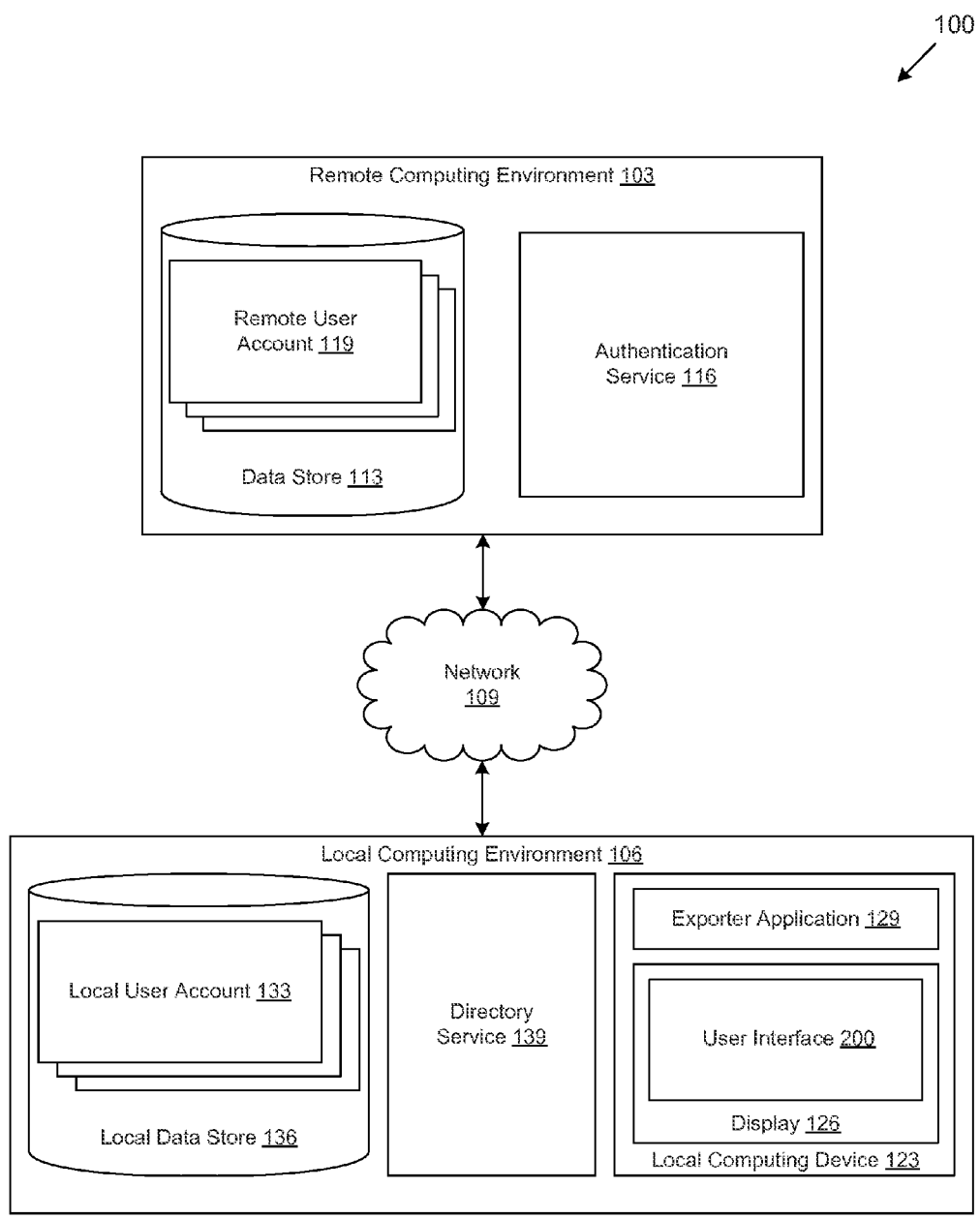
FIG. 1 is a drawing of a networked environment according to various embodiments of the present disclosure.

With reference to FIG. 1, shown is a networked environment 100 according to various embodiments. The networked environment 100 includes a remote computing environment 103 and a local computing environment 106, that are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The remote computing environment 103 may comprise, for example, a server computer or any other system providing computing capability. Alternatively, the remote computing environment 103 may employ a plurality of computing devices that may arranged, for example, in one or more server banks or computer banks or other arrangements. Such computing devices may be located in a single installation or may be distributed among many different geographical locations. Further, such computing devices may be in networked communication with each other. For example, the remote computing environment 103 may include a plurality of computing devices that together may comprise a cloud computing resource, a grid computing resource, and/or any other distributed computing arrangement. In some cases, the remote computing environment 103 may correspond to an elastic computing resource where the allotted capacity of processing, network, storage, or other computing-related resources may vary over time.

Various applications and/or other functionality may be executed in the remote computing environment 103 according to various embodiments. Also, various data is stored in a data store 113 that is accessible to the remote computing environment 103. The data store 113 may be representative of a plurality of data stores 113 as can be appreciated. The data stored in the data store 113, for example, is associated with the operation of the various applications and/or functional entities described below.

The components executed on the remote computing environment 103, for example, include the authentication service 116, and other applications, services, processes, systems, engines, or functionality not discussed in detail herein. The authentication service 116 is executed to authenticate users accessing the remote computing environment 103 and authorize use by authenticated users of computing resources provided by the remote computing environment 103.

The data stored in the data store 113 includes, for example, remote user accounts 119 and associated data as well as potentially other data. Data associated with a remote user account 119 may include login credentials, authorization or access permissions, user data, and other such data. Login credentials may include information such as user names, passwords, digital certificates, authentication or access codes, data related to multi-factor authentication, and other such data. Authorization or access permissions may include data related to resources a user may or may not use, limitations on the use of a particular resource by a user, limitations on when a user may or may not use a particular resource, and other related data. Authorization or access permissions may be set on a per account basis, or remote user accounts 119 may be assigned to groups and inherit permissions and restrictions on the basis of group membership. User data may include data such as the first and last name of the user, the email address of the user, the phone number of the user, the address of the user, and other such data.

Users are generally not provided with direct access to the remote computing environment 103. Instead, access to the remote computing environment 103 is generally made through a publicly facing application programming interface (API). Calls to the API may be made remotely or locally through HTTP calls using the representational state transfer (REST) protocol or the simple object access protocol (SOAP). Any number of applications may make API calls, including network applications executing in the remote computing environment 103 and made available through network pages rendered in a browser or custom applications executed in a local computing environment.

Because access to and use of the remote computing environment 103 is made through calls to a publicly accessible API, authentication and authorization credentials for authorized users are generally included in requests to the API. This prevents unauthorized usage of the remote computing environment 103. Authorization credentials may include a username and password, a digital certificate, an authorization token, or other such credentials associated with a remote user account 119. Requests to the API may be encrypted using the secure sockets layer (SSL) or transport layer security (TLS) protocols to prevent interception of authentication and authorization credentials.

The local computing environment 106 is representative of a plurality of local computing devices 123 that may be coupled to the network 109. The local computing device 123 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The local computing device 123 may include a display 126. The display 126 may comprise, for example, one or more devices such as liquid crystal displays (LCDs), gas plasma-based flat panel displays, organic light emitting diode (OLED) displays, LCD projectors, or other types of display devices, etc.

The local computing device 123 may be configured to execute various applications such as the exporter application 129 and/or other applications. The exporter application 129 may be executed in the local computing device 123, for example, to access network content served up by the remote computing environment 103 or the local computing environment 106 and/or other servers, thereby rendering a user interface 200 on the display 126. To this end, the exporter application 129 may comprise, for example, a browser, a dedicated application, etc., and the user interface 200 may comprise a network page, an application screen, etc. The local computing device 123 may be configured to execute applications beyond the exporter application 129 such as, for example, email applications, social networking applications, word processors, spreadsheets, and/or other applications.

Local user accounts 133 and associated data are stored within the local data store 136. It is understood that a plurality of local user accounts 133 may exist. Data associated with a user account may include login credentials, authorization or access permissions, user data, and other such data. Login credentials may include information such as user names, passwords, digital certificates, authentication or access codes, data related to multi-factor authentication, and other such data. Authorization or access permissions may include data related to resources a user may or may not use, limitations on the use of a particular resource by a user, limitations on when a user may or may not use a particular resource, and other related data. Authorization or access permissions may be set on a per account basis, or local user accounts 133 may be assigned to groups and inherit permissions and restrictions on the basis of group membership. User data may include personally identifying data such as the first and last name of the user, the email address of the user, the phone number of the user, the address of the user, and other such data.

A directory service 139 may provide data associated with local user accounts 133 in response to requests for said data. Requests may come in many forms and may request some or all of the data associated with one or more local user accounts 133 stored in the local data store 136. A request may, for example, comprise a request from a client application such as an email application for an email address associated with a user account. In another example, the login prompt provided by the operating system of the local computing device 123 may request that the directory service authenticate a password associated with a user account. In a preferred embodiment of the present disclosure, the directory service 139 will interoperate with other applications using industry standards such as X.500, the directory access protocol (DAP), and the lightweight directory access protocol (LDAP). Examples of such directory services include Active Directory™, eDirectory™, Open Directory™, and OpenLDAP™.

Next, a general description of the operation of the various components of the networked environment 100 is provided. To begin, it is assumed that at least one remote user account 119 with sufficient authorization privileges exists, and that the exporter application 129 has access to the appropriate credentials for the remote user account 119.

The exporter application 129 begins execution on the local computing device 123. As part of the initial stages of execution, the exporter application 129 queries the directory service 139 for a listing of all local user accounts 133 and a listing of all data associated with each local user account 133. In a preferred embodiment of the present disclosure, the exporter application and the directory service 139 communicate using LDAP and X.500. The directory service 139 then responds to the query of the exporter application 129 with a listing of all available data.

It is understood that, depending on the number of local user accounts 133 and the amount of data associated with each local user account 133, it may be more efficient for the exporter application 129 to request a list of user accounts and a list of associated data instead with each local user account 133 instead of the requesting the associated data. This is particularly true where the number of local user accounts 133 may be particularly large, and therefore the volume of associated data may be particularly great. In other situations, where the number of local user accounts 133 is small or a minimal amount of associated data is stored, it may be more efficient for the exporter application 129 to request a list of all local user accounts 133 and request all data associated with each local user account 133 from the directory service 139.

After the directory service 139 has responded to the query of the exporter application 129, the exporter application 129 renders a user interface 200 on the display 126. The user interface 200 renders a list of the local user accounts 133 and the data associated with each local user account 133. The user interface 200 further obtains a selection of local user accounts 133, groups of local user accounts, and data associated with each local user account 133.

After the user interface 200 of the exporter application 129 obtains a selection of local user accounts 133 and data associated with each local user account 133, the exporter application then validates the selection. Validation consists of checking that a minimum set of data associated with the local user accounts 133 has been selected. Generally, the minimum set of data required will comprise a first name, a last name, and an email address. However, various implementations of the present disclosure may require additional data. If the exporter application 129 detects an error during validation, such as a lack of an email address, then an error message will be rendered within the user interface 200 displayed on the display 126.

If validation is successful, the exporter application 129 then renders a user interface 200 on the display 126 of the local computing device 123 in order to obtain a selection of a list of permissions to assign to remote user accounts 119 that will be created upon export. It is understood that the permissions associated with remote user accounts 119 do not correspond to permissions associated with local user accounts 133. To the extent that permissions do correspond or overlap, it is understood that such correspondence is often coincidental.

After a selection of permissions to be assigned has been obtained, the selected local user accounts 133 and associated data are exported. Export occurs when the authentication service 116 is supplied with sufficient information to create remote user accounts 119 which correspond to the selected local user accounts 133 on a one-to-one basis. The authentication service 116 will create new remote user accounts 119 which share the same username as the corresponding local user account 133 and which have the same associated data as was selected for export previously. In addition, each newly created remote user account 119 will have the permissions assigned to it that were previously selected.

In one embodiment of the present disclosure, export is conducted in real time. Export begins with the exporter application 129 directing the local computing device 123 to communicate across the network 109 with the remote computing environment 103. The exporter application 129 supplies previously supplied authentication credentials to the authentication service 116. Upon authentication of the exporter application 129, the directory service 139 is queried for the selected data associated with each selected local user account 133. A list of the selected local user accounts 133, the data selected for export associated with each local user account, and the selected permissions to be assigned are then supplied across the network to the authentication service 116. Upon receipt of the exported data, the authentication service 116 creates remote user accounts 119 which correspond to the selected local user accounts 133. The created remote user accounts 119 and the selected local user accounts 133 should have the username and selected associated data in common.

In a second embodiment of the present disclosure, export is conducted as a batch operation. In this particular embodiment, export comprises of the exporter application 129 querying the directory service 139 for selected local user accounts 133 and associated data. The usernames and other selected data associated with the selected local user accounts are written to a file stored on the local computing device 123 or the local data store 136. The file may comprise a text file formatted in compliance with the extensible markup language (XML) standard, a flat file, a comma or tab separated value file (CSV or TSV), or other similar file. Writing the selected data associated with the selected local user accounts to file allows for the exported information to be manually or programmatically verified. Subsequently, the file is uploaded to the authentication service 116 either manually or programmatically. After the file is uploaded, the authentication service 116 creates remote user accounts 119 which correspond to the selected local user accounts 133. The created remote user accounts 119 and the selected local user accounts 133 should have the username and selected associated data in common.

Regardless of the manner of export, the authentication service 116 contacts the user associated with each newly created remote user account 119 using the imported information associated with each remote user account 119 in order to permit the user associated with the newly created remote user account 119 to create suitable authentication credentials. Users may be contacted in real time as the associated remote user account 119 is created, or users may be contacted in batch after the authentication service 116 has completed importing all selected local user accounts 133 and created all corresponding remote user accounts 119

In one particular embodiment, the authentication service 116 sends an email to the email address associated with the newly created remote user account 119. The email may contain instructions for creating a new password as well as either a temporary password or a URL linking to a network page, such as a web page, that permits a user to create a new password. Additional security may be provided by marking the temporary password or the URL as valid for a predetermined period of time, such as 24, 48, or 72 hours. The temporary password or URL will cease to function after predetermined period of time has passed, forcing a user to quickly create a new and secure password.

In another particular embodiment, the authentication service 116 causes a letter containing a temporary password to be mailed to the mailing address associated with the newly created remote user account 119. The temporary password will permit the user associated with the newly created remote user account 119 to login to the remote computing environment 103 through the authentication service 116.

In a third particular embodiment, the authentication service 116 causes a phone call to be made to a phone number associated with the newly created remote user account 119. While live operators may be used, it is expected that automated dialers will be used to make the phone call. The purpose of the phone call is to provide the user associated with the newly created remote user account 119 with a temporary password which can be used to access the remote computing environment 103 through the authentication service 116.

Figure 2A:
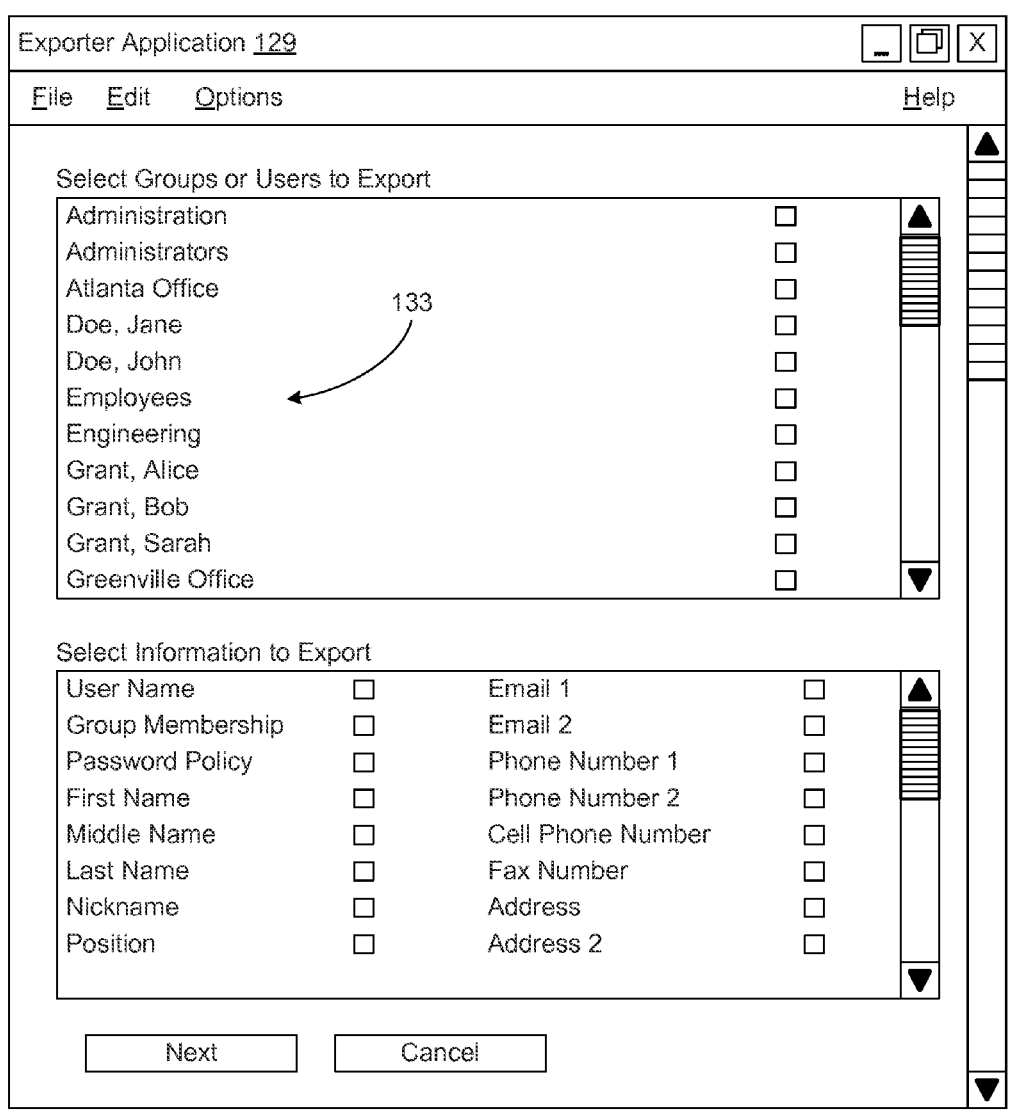

Referring next to FIG. 2A, shown is an example user interface 200, denoted herein as user interface 200a, according to various embodiments of the present disclosure. It is understood that the user interface 200a is rendered by the exporter application 129 on the display 126 (FIG. 1) of the local computing device 123 (FIG. 1). In this particular embodiment, user interface 200a is generated by the exporter application 129 after querying the directory service 139 (FIG. 1) for a list of local user accounts 133 and a list of data available to the directory service 139 that is associated with each local user account 133. User interface 200a subsequently lists the response to the exporter application's 129 query in order to permit the local computing device 123 to obtain a user interaction selecting a plurality of local user accounts and associated data for export from the local computing environment 106 (FIG. 1) to the remote computing environment 103 (FIG. 1).

In some embodiments of the present disclosure, the exporter application 129 may preselect a minimum set of associated data necessary for the creation of remote user accounts 119 (FIG. 1). For example, the first name, last name, and an email address or other item of contact information may be selected in order to create default usernames and permit users to be contacted in order to create a password. In the event that data items from the minimum set have not been selected when export begins, an error message would be rendered on the display 126 and export would halt. The error message would describe in detail the nature of the error, identify the omitted data item necessary for export, and provide other necessary information or instructions sufficient for a user to correct the error.

Figure 2B:
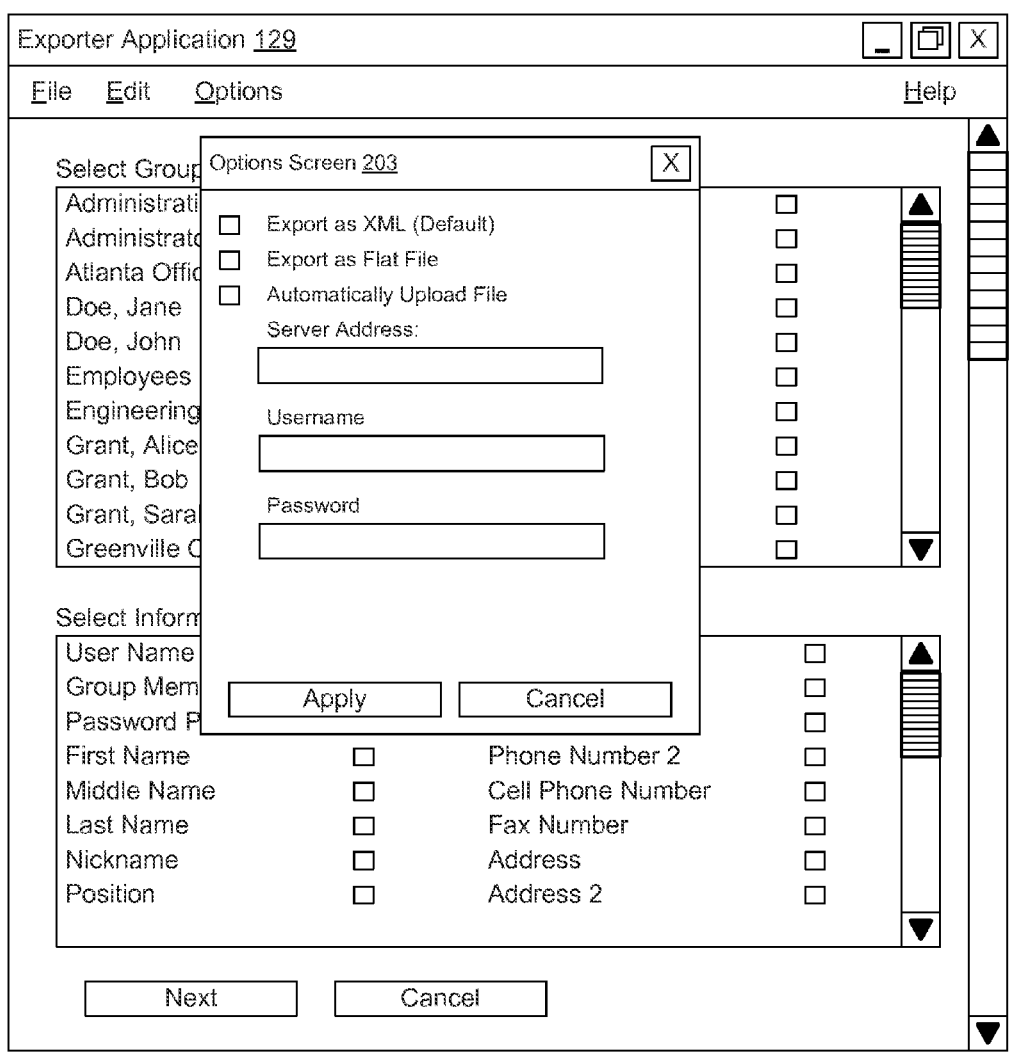

Turning now to FIG. 2B, shown is a second example user interface 200, denoted herein as user interface 200b, according to various embodiments of the present disclosure. It is understood that the user interface 200b is rendered by the exporter application 129 on the display 126 (FIG. 1) of the local computing device 123 (FIG. 1). In this particular embodiment, user interface 200b is generated by the exporter application 129 in response to the local computing device obtaining a user interaction to specify options. An options screen 203 has been subsequently displayed. The options screen 203 permits the local computing device 123 to obtain from a user selections that specify desired behavior for the export of local user accounts 133 (FIG. 1) from the local computing environment 106 (FIG. 1) to the remote computing environment 103 (FIG. 1). In this particular embodiment, the options screen 203 allows for the selection of export to a file or automatically to a remote server within the remote computing environment 103, or to write the exported information to a flat file or XML file. Other embodiments of the present disclosure may provide for additional options within the options screen 203 as necessary.

Moving on to FIG. 2C, shown is a third example user interface 200, denoted herein as user interface 200c, according to various embodiments of the present disclosure. It is understood that the user interface 200c is rendered by the exporter application 129 on the display 126 (FIG. 1) of the local computing device 123 (FIG. 1). In this particular embodiment, user interface 200c is generated by the exporter application 129 to permit the local computing device 123 to obtain a user interaction specifying permissions associated with remote user accounts 119 (FIG. 1) of the remote computing environment 103 (FIG. 1) to assign to previously selected local user accounts 133.

Figure 3:
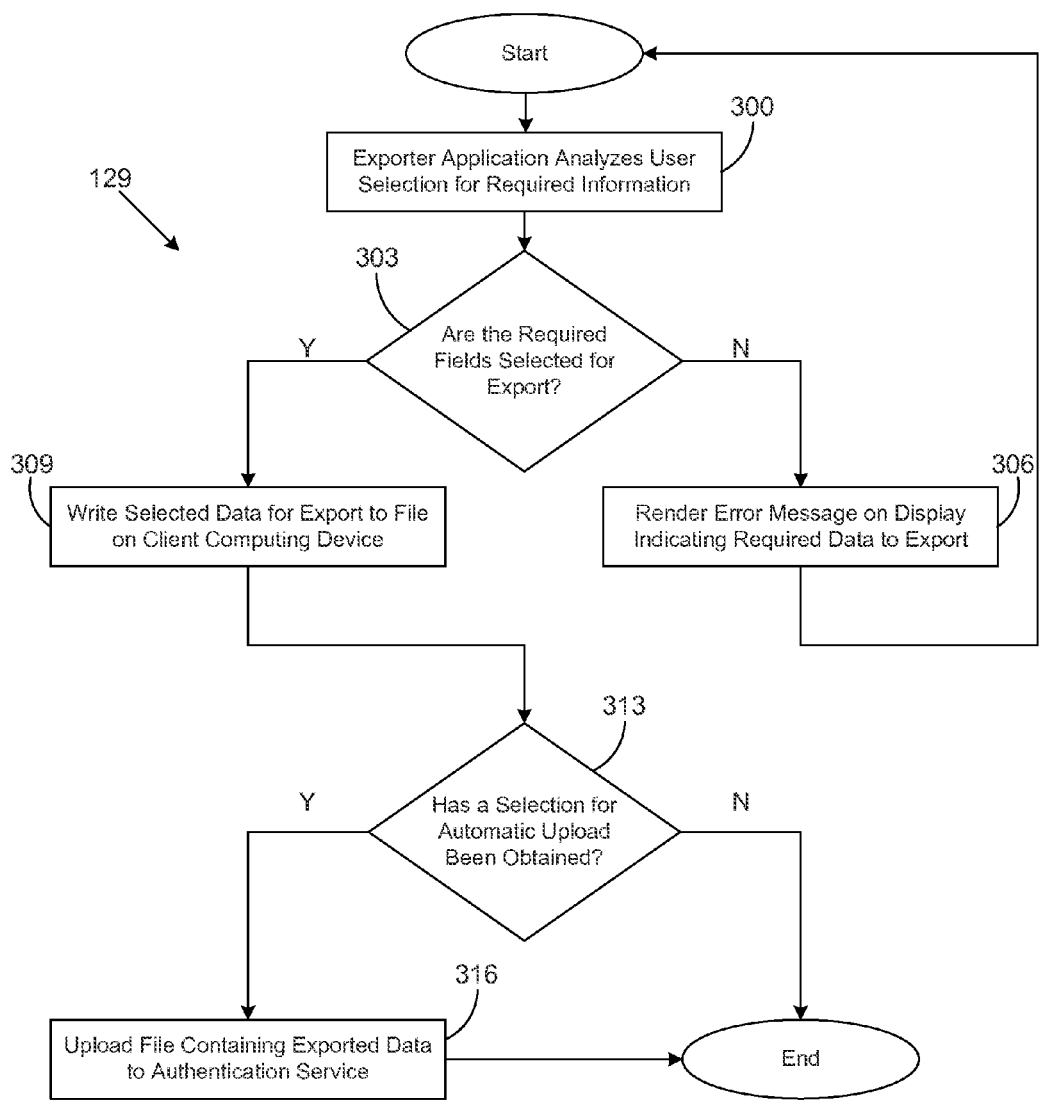
FIG. 3 is a flowchart illustrating one example of functionality implemented as portions of an exporter application executed in a local computing environment in the networked environment of FIG. 1 according to various embodiments of the present disclosure.

Referring next to FIG. 3, shown is a flowchart that provides one example of the operation of a portion of the exporter application 129 according to various embodiments. It is understood that the flowchart of FIG. 3 provides merely an example of the many different types of functional arrangements that may be employed to implement the operation of the portion of the exporter application 129 as described herein. As an alternative, the flowchart of FIG. 3 may be viewed as depicting an example of steps of a method implemented in the local computing environment 106 (FIG. 1) according to one or more embodiments.

Beginning with box 300 the exporter application 129 analyzes the selection of users and associated user data. It is assumed that the exporter application 129 has already queried the directory service 139 (FIG. 1) for a list of local user accounts 133 (FIG. 1) and associated data. It is further assumed that the results of the query have already been rendered within user interface 200 (FIG. 2A) and a user selection has been obtained.

As part of its analysis, the exporter application 129 first determines which local user accounts 133 have been selected for export. Such a determination is made by checking for the selection of an individual local user account 133 or the selection of a group to which a local user account 133 belongs. The exporter application 129 then determines which data associated with the local user accounts 133 has been selected for export.

Proceeding to box 303, the exporter application 129 validates the selected data. Validation comprises of checking to determine if a predefined minimum set of data associated with the local user accounts 133 has been selected. In many embodiments, the minimum set of data comprises of a first name, a last name, and at least one method for contacting a user associated with a user account. Validation may, but need not be, conducted on a per field basis. For example, more than one email address may be associated with a local user account 133. Validation may require that at least one email address be selected, but need not require that a specific email address be selected. If validation fails, execution proceeds to box 306. However, if validation succeeds, execution proceeds to box 309.

Box 306 represents the case where validation has failed. In this instance the exporter application 129 causes an error message to be rendered within the user interface 200 of the display 126 (FIG. 1) on the local computing device 123 (FIG. 1). The contents of the error message are expected to be descriptive in identifying the source of the error and specifying how the error can be corrected. Execution then proceeds back to the start where a new user selection is obtained in response to the error message.

Box 309 represents the case where validation has succeeded. The exporter application 129 then proceeds to write the selected data to file for export. The file is generally expected to be a text file in order to permit manual verification of the exported data before upload to the authentication service 116 (FIG. 1) if desired. Such text files may be in any number of forms such as an extensible markup language (XML) file or a flat file such as a comma separated value (CSV) or tab separated value (TSV) file. However, a binary file may be desired in certain implementations or embodiments of the present disclosure and may therefore be used instead of a text file.

Proceeding to box 313, the exporter application determines if a selection of an option to automatically upload the exported data to the authentication service 116 has been obtained. It is understood that obtaining a user selection of the option to automatically upload the exported data includes obtaining any necessary information such as login or authentication credentials, including an appropriate username and password, and a network address such as an IP address or a hostname. If a selection of the option to automatically upload the exported data has not been obtained, then execution ends. However, if a selection for the option to automatically upload the exported data has been obtained, then execution proceeds to box 316.

In box 316, the exporter application 129 has obtained a user interaction indicating that the exporter application 129 should automatically upload the exported data. The exporter application 129 transfers the file containing the exported user account data to the authentication service 116. If authentication is necessary and credentials were supplied, then the exporter application will first authenticate itself before beginning the file transfer. If the file is particularly large, for example as a result of a large number of users or a voluminous amount of associated data, the exporter application may compress the file using one of any number of algorithms known to those of ordinary skill in the art before beginning transmission. The purpose of such compression is to reduce the amount of bandwidth used and the decrease the transmission time.

The exporter application 129 may also implement multiple security measures to protect user data before beginning transmission. Various embodiments may choose to encrypt the file using one of any number of algorithms known to those of ordinary skill in the art before beginning transmission. Examples of such algorithms include the Advanced Encryption Standard (AES), Triple DES (3DES), Blowfish, Twofish, Serpent, or other such algorithms. Alternatively, the network connection between the local computing device 123 and authentication service 116 may be secured using application protocols such as secure sockets layer (SSL) or transport layer security (TLS). Encrypting the file protects the contents of the file in the event that the file is intercepted during transmission or a copy is obtained after transmission. Securing the connection between the local computing device 123 and the authentication service 116 prevents interception of the file during transmission, but does not maintain the security of data within the file after transmission is complete.

Figure 4:
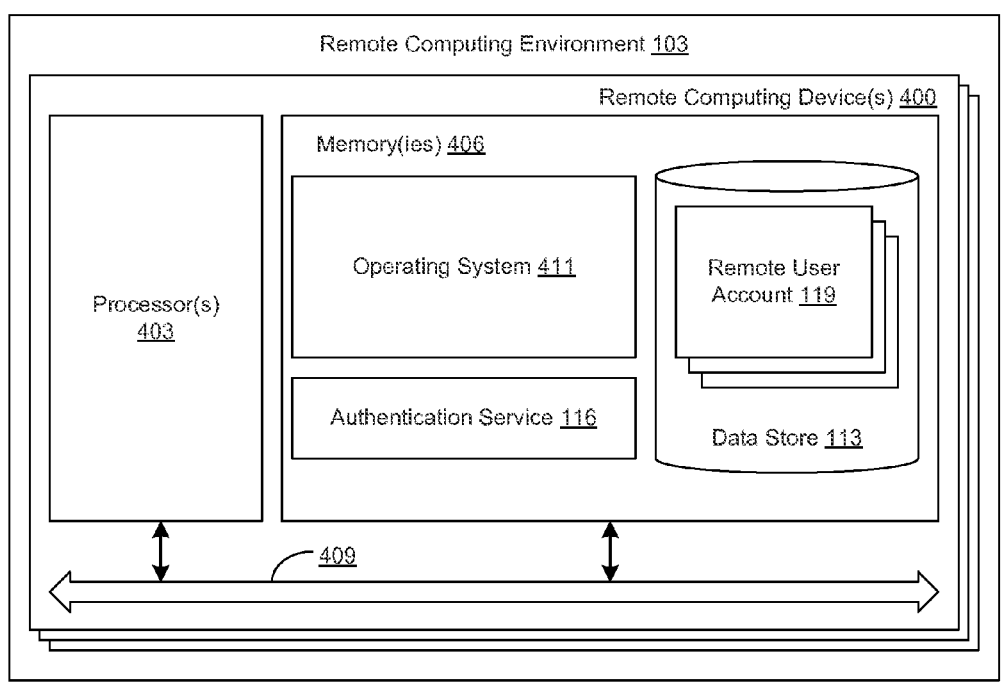
FIG. 4 is a schematic block diagram that provides one example illustration of the remote computing environment employed in the networked environment of FIG. 1 according to various embodiments of the present disclosure.
Figure 5:
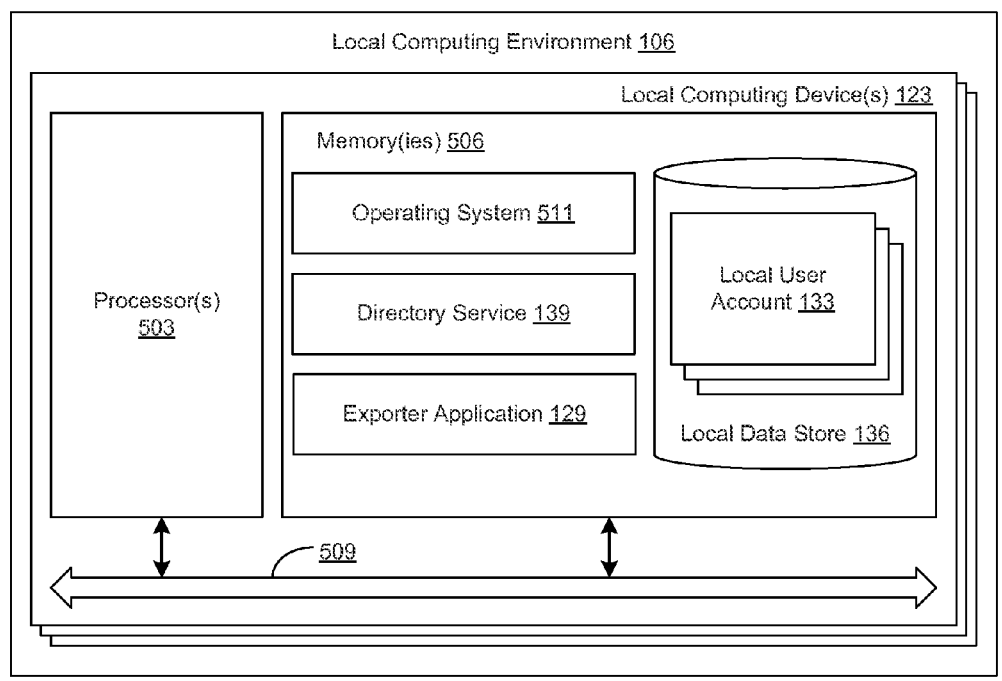
FIG. 5 is a schematic block diagram that provides one example illustration of the local computing environment employed in the networked environment of FIG. 1 according to various embodiments of the present disclosure.

With reference to FIG. 4 and FIG. 5, shown is a schematic block diagram of the remote computing environment 103 and the local computing environment 106 according to an embodiment of the present disclosure. The remote computing environment 103 constitutes a networked plurality of computing devices 400. The local computing environment 106 includes one or more local computing devices 123. Each computing device 400 and local computing device 123 includes at least one processor circuit, for example, having a processor 403 or 503 and a memory 406 or 506, both of which are coupled to a local interface 409 or 509. To this end, each computing device 400 or 123 may comprise, for example, at least one server computer or like device. The local interface 409 or 509 may comprise, for example, a data bus with an accompanying address/control bus or other bus structure as can be appreciated.

Stored in the memory 406 or 506 are both data and several components that are executable by the processor 403 or 503. In particular, stored in the memory 406 and executable by the processor 403 is the authentication service 116, and potentially other applications. Also stored in the memory 406 may be a data store 113 and other data such as data associated with remote user accounts 119. Similarly, a local data store 136 containing data associated with local user accounts 133 and other such data may be stored in the memory 506. In addition, an exporter application 129 and a directory service 139 may be stored in the memory 506 and executable by the processor 503. In addition, an operating system 411 or 511 may be stored in the memory 406 or 506 and executable by the processor 403 or 503.

It is understood that there may be other applications that are stored in the memory 406 or 506 and are executable by the processor 403 or 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 or 506 and are executable by the processor 403 or 503. In this respect, the term "executable" means a program file that is in a form that can ultimately be run by the processor 403 or 503. Examples of executable programs may be, for example, a compiled program that can be translated into machine code in a format that can be loaded into a random access portion of the memory 406 or 506 and run by the processor 403 or 503, source code that may be expressed in proper format such as object code that is capable of being loaded into a random access portion of the memory 406 or 506 and executed by the processor 403 or 503, or source code that may be interpreted by another executable program to generate instructions in a random access portion of the memory 406 or 506 to be executed by the processor 403 or 503, etc. An executable program may be stored in any portion or component of the memory 406 or 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 or 506 is defined herein as including both volatile and nonvolatile memory and data storage components. Volatile components are those that do not retain data values upon loss of power. Nonvolatile components are those that retain data upon a loss of power. Thus, the memory 406 or 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 or 503 may represent multiple processors 403 or 503 and/or multiple processor cores and the memory 406 or 506 may represent multiple memories 406 or 506 that operate in parallel processing circuits, respectively. In such a case, the local interface 409 or 509 may be an appropriate network that facilitates communication between any two of the multiple processors 403 or 503, between any processor 403 or 503 and any of the memories 406 or 506, or between any two of the memories 406 or 506, etc. The local interface 409 or 509 may comprise additional systems designed to coordinate this communication, including, for example, performing load balancing. The processor 403 or 503 may be of electrical or of some other available construction.

Although the exporter application 129, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the exporter application 129. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the exporter application 129, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
    code that obtains a selection of a local user account and a data item associated with the local user account stored in a directory service, wherein the local user account and the data item associated with the local user account are stored in a hierarchical manner and the directory service complies with at least one version of a directory access protocol;
    code that analyzes the selected data item associated with the local user account to verify that a predefined set of data items associated with the local user account has been selected;
    code that permits an assignment of another selection of a remote computing environment permission to the local user account;
    code that writes the selection of the local user account and the at least one data item associated with the local user account and the assignment to a file stored in a memory of the at least one computing device; and
    code that uploads the file to a predefined authentication service executing on a remote server associated with a remote computing environment through a network connection, wherein the file directs the predefined authentication service to create a plurality of additional remote user accounts, wherein the additional remote user accounts are associated with the at least one selection of the data item in the file.

2. The non-transitory computer-readable medium of claim 1, further comprising code that sends an email comprising a set of instructions for setting a password to an email address, wherein the selected data item comprises the email address.

3. The non-transitory computer-readable medium of claim 1, wherein the selected data item further comprises a first name and a last name.

4. The non-transitory computer-readable medium of claim 1, wherein the file comprises an extensible markup language file.

5. The non-transitory computer-readable medium of claim 1, wherein the file comprises a flat file.

6. A system, comprising:
    at least one computing device; and
    an exporter application executable in the at least one computing device, the exporter application comprising:
        logic that obtains a first selection of a local user account and a second selection of at least one data item associated with the local user account stored in a directory service;
        logic that analyzes the second selection to verify that a predefined set of data items associated with the user account has been selected;
        logic that writes the first selection of the at least one local user account and the second selection of the at least one data item associated with the local user account to a file; and
        logic that automatically uploads the file to an authentication service executing on a remote server associated with a remote computing environment, wherein the file directs the authentication service to create a plurality of additional remote user accounts, wherein the additional remote user accounts are associated with the at least one selection of the data item in the file.

7. The system of claim 6, wherein the file comprises an extensible markup language file.

8. The system of claim 6, wherein the file comprises a flat file.

9. The system of claim 6, wherein the second selection of the at least one data item comprises an email address, a first name, and a last name.

10. The system of claim 6, wherein the at least one data item associated with the local user account is stored in a hierarchical manner.

11. They system of claim 6, wherein the directory service complies with at least one version of a directory access protocol.

12. The system of claim 6, wherein the exporter application further comprises logic that permits an assignment of a remote computing environment permission to the first selection of the at least one local user account.

13. A method, comprising:
    querying, by a computing device, a directory service for at least one selection of a data item associated with at least one user account stored in the directory service;

analyzing, in the computing device, the at least one selection of the data item that is obtained from querying to verify that a predefined set of data associated with the at least one user account has been selected;

writing, by the computing device, the at least one selection of the data item to a file; and uploading the file from the computing device to an authentication service executing on a remote server associated with a remote computing environment, wherein the file directs the authentication service to create a plurality of additional remote user accounts, wherein the additional remote user accounts are associated with the at least one selection of the data item in the file.

14. The method of claim 13, wherein individual ones of the plurality of additional remote user accounts have a user name that is identical to a corresponding user name of the associated at least one selection of the data item in the file.

15. The method of claim 13, wherein the file directs the authentication service to remove a plurality of existing remote user accounts, wherein the plurality of existing remote user accounts are associated with the at least one selection of the data item in the file.

16. The method of claim 13, further comprising sending an email, from the computing device, comprising an instruction for setting a password, wherein the at least one selection of the data item comprises an email address.

17. The method of claim 16, wherein the email further comprises instructions for creating a user name.

18. The method of claim 16, wherein the instructions include a uniform resource locator (URL) that refers to a network page configured to set the password.

19. The method of claim 18, wherein the URL is valid for a predefined period of time.

20. The method of claim 13, wherein the file comprises an extensible markup language file.

* * * * *